United States Patent [19]
Fletcher et al.

[11] 3,869,151
[45] Mar. 4, 1975

[54] INTERNALLY SUPPORTED FLEXIBLE DUCT JOINT

[76] Inventors: James Fletcher, Administrator of the National Aeronautics and Space Administration with respect to an invention by; Ralph F. Kuhn, Jr., 24723 Mulholland Highway, Calabasas, Calif.; 91302

[22] Filed: Apr. 16, 1974

[21] Appl. No.: 461,477

[52] U.S. Cl. .............................. 285/114, 285/226
[51] Int. Cl. .......................................... F16l 27/04
[58] Field of Search ........... 285/226, 227, 228, 229, 285/114, 299, 300, 301, 118; 403/50, 51; 74/18, 18.1

[56] References Cited
UNITED STATES PATENTS

| | | | |
|---|---|---|---|
| 2,103,988 | 12/1937 | LeBus | 285/118 |
| 2,901,272 | 8/1959 | Anderson | 285/227 |
| 3,070,387 | 12/1962 | Peyton | 285/114 |
| 3,659,879 | 5/1972 | Stalph | 285/227 X |
| 3,669,470 | 6/1972 | Deuvloo | 285/226 X |

FOREIGN PATENTS OR APPLICATIONS

| | | | |
|---|---|---|---|
| 1,361,040 | 4/1964 | France | 285/227 |
| 10,321 | 7/1887 | Great Britain | 285/226 |

*Primary Examiner*—Thomas F. Callaghan
*Attorney, Agent, or Firm*—Wayland H. Riggins; L. D. Woffard, Jr.; John R. Manning

[57] ABSTRACT

An internally supported, flexible duct joint for use in conducting fluids under relatively high pressures in systems where relatively large deflection angles must be accommodated. The joint includes a flexible tubular bellows and an elongated base disposed within the bellows. The base is connected through radiating struts to the bellows near mid-portion thereof and to each of the opposite end portions of the bellows through a pivotal connecting body. A motion-controlling linkage is provided for linking the connecting bodies, whereby angular displacement of the joint is controlled and uniformity in the instantaneous bend radius of the duct is achieved as deflection is imposed thereto.

7 Claims, 7 Drawing Figures

PATENTED MAR 4 1975

3,869,151

INTERNALLY SUPPORTED FLEXIBLE DUCT JOINT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to flexible duct joints for high-pressure systems, and more particularly to an internally supported flexible duct joint adapted to be deflected with a uniform bend radius, whereby bending stress is reduced and fatigue life is increased.

The prior art is, of course, replete with flexible duct joints of the type including tubular bellows and particularly suited for use in uniting adjacent ends of angularly related ducts. Often, the angular relationship established between the ducts is varied periodically. Consequently, the duct joints must be flexible enough to accommodate such changes in angular relationship. Where the duct joints are subjected, operationally, to high operating pressures and large deflection angles, special consideration must be given to problems relating to bending stress introduced as a result of pressurization.

As can readily be appreciated by those familiar with the design and fabrication of flexible duct joints, there is an attendant increase in bending stress as internal pressures within the bellows is increased. As a consequence, the joint often experiences lateral shift or change in bend radius in a manner not unlike that experienced by an axially loaded curved beam supported with the ends thereof restrained. Of course, a reduction in fatigue life attends increased stress resulting from a reduction of the bend radius.

Heretofore, attempts have been made to overcome the aforementioned disadvantages by providing a plurality of coaxially aligned bellows assemblies to accommodate the angulation requirements or, alternatively, to employ bellows having higher inherent stiffness resulting from an increased mass. Such design practices have resulted in complex, massive, and expensive joints often totally impractical for use in environments wherein reduction of weight and simplicity in design are of utmost concern.

It therefore is the purpose of the instant invention to provide an improved flexible duct joint of the type including a flexible tubular bellows having particular utility in an operational environment wherein the joint is subjected to relatively high internal pressures and large angles of deflection.

OBJECTS AND SUMMARY OF THE INVENTION

An object of the instant invention is to provide an improved flexible duct joint which overcomes the aforementioned disadvantages.

It is another object to provide an improved flexible duct joint of the type including an internally supported flexible, tubular bellows.

It is another object to provide in a flexible duct joint of the type including a flexible, tubular bellows, improved means for controlling angular deflection imparted to the tubular bellows, when the joint is subjected to both high internal pressures and large deflection angles.

It is another object to provide a lightweight flexible duct joint, the midspan of which is restrained by an internal tie and the deflection thereof is controlled for imposing uniformity on the bend radius of the bellows as deflection occurs, whereby lateral shift in the midspan of the bellows is precluded.

These and other objects and advantages are achieved through a lightweight flexible duct joint including a tubular, flexible bellows having a pair of opposite end portions, an elongated base disposed internally of the bellows and having an end portion disposed adjacent to each of the opposite end portions of the bellows, a plurality of angularly related struts projected radially from the elongated base and connected with the side walls of the bellows, a pair of annular supports, each being rigidly affixed to one end portion of the bellows in a concentric relationship therewith, a pair of elongated connecting bodies, each including a plurality of angularly related struts extended radially from the body and affixed to the internal surfaces of one of the annular supports, a universal joint for coupling each of the connecting bodies with one end of the elongated base, a pair of lever arms, each being projected axially from one of the connecting bodies and concentrically related to the elongated base, and a ball-and-socket coupling joint interconnecting the distal ends of the lever arms within the base, whereby angular motion imparted to one of the lever arms is transmitted to the other lever arm through the coupling joint, as will become more readily apparent by reference to the following description and claims in light of the accompanying drawings.

DESCRIPTION OF THE PREFERRED EMBODIMENT

Figure 1:
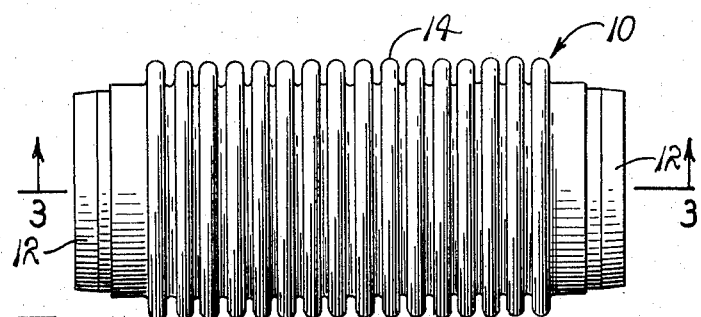
FIG. 1 is a top plan view of an improved lightweight, flexible duct joint embodying the principles of the instant invention.
Figure 2:
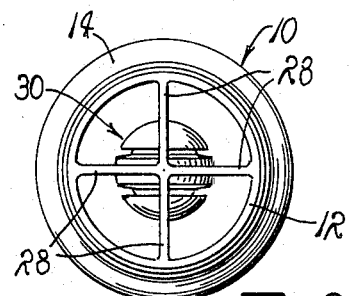
FIG. 2 is an end view of the joint shown in FIG. 1.
Figure 3:
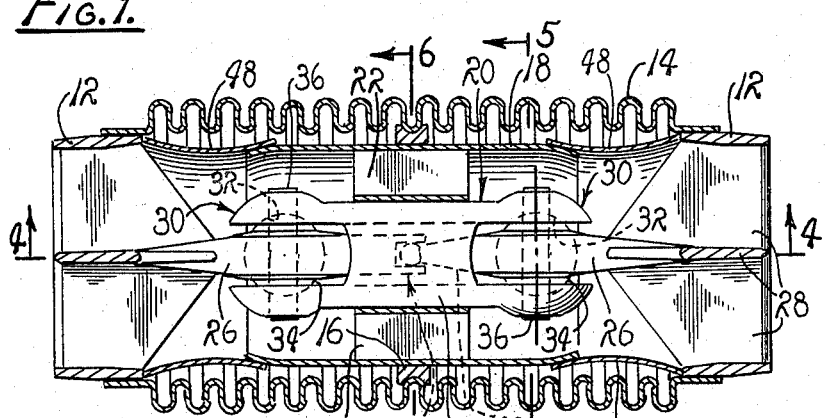
FIG. 3 is a cross sectional view taken generally along line 3—3 of FIG. 1.
Figure 5:
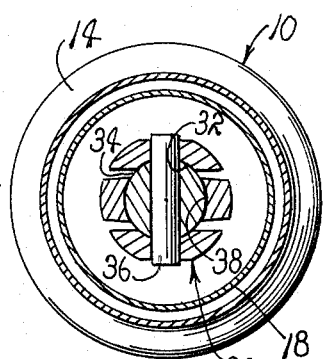
FIG. 5 is a cross sectional view taken generally along line 5—5 of FIG. 3.
Figure 4:
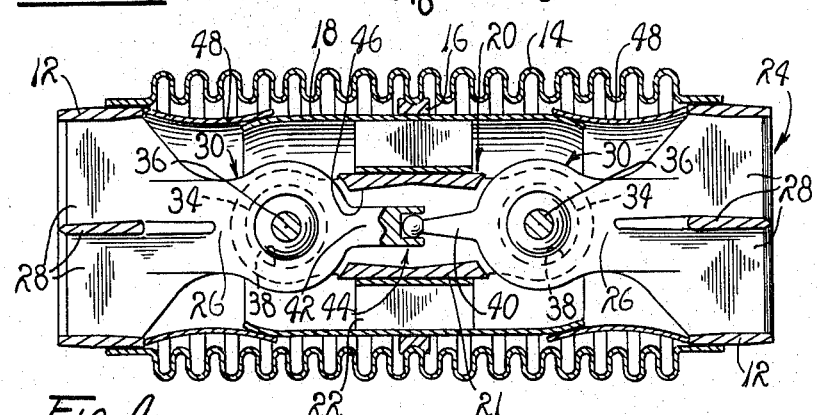
FIG. 4 is a cross sectional view taken generally along line 4—4 of FIG. 3.
Figure 6:
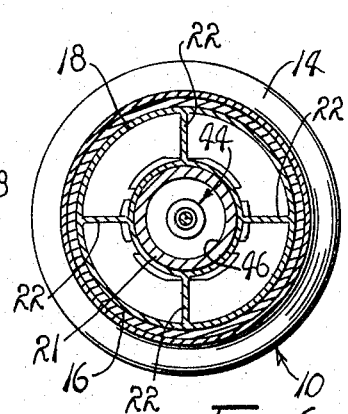
FIG. 6 is a cross sectional view taken generally along line 6—6 of FIG. 3.
Figure 7:
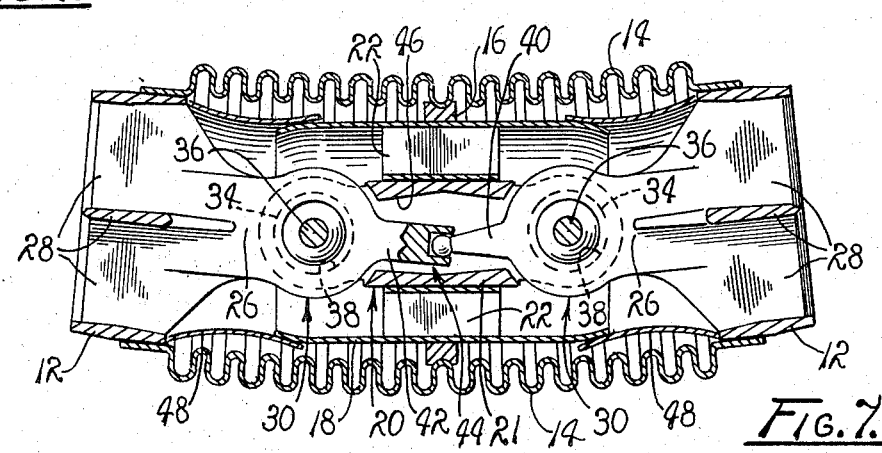
FIG. 7 is a cross sectional view, similar to FIG. 4, with the joint being angularly deflected.

Referring now with more specificity to the drawings wherein like reference characters designate like or corresponding parts throughout the several views, there is shown in FIG. 1 a flexible duct joint, generally designated 10, which embodies the principles of the instant invention.

It is to be understood that the joint 10 is, in operation, subjected to both relatively high internal pressures and large deflection angles. Such pressures and angles often are common to propulsion systems provided for spacecraft and the like.

The duct joint 10 is of a tubular configuration and is provided with a support 12, of an annular configuration, at each of its opposite ends. The supports 12, where so desired, include a tapered external surface for facilitating a mating of the joint 10 with an adjacent segment of a pressurizable duct. Extended between the supports 12 there is a tubular, convoluted bellows 14. The bellows 14 includes annular corrugations and is secured at each of its opposite ends to the external surfaces of the supports 12.

Within the bellows 14, near the mid-portion thereof, there is provided an annulus 16 to which is rigidly secured the bellows 14 by suitable means including weld beads, not shown. Hence, it can be appreciated that the bellows 14 is supported, internally, at each of its opposite ends by the supports 12 and at its mid-portion by the annulus 16.

The annulus 16, in turn, is seated in circumscribing relation with a sleeve 18. Disposed within the sleeve 18, in concentric relation therewith, there is an elongated base, generally designated 20, including a tubular body 21. From the body 21 there is a plurality of radially extended, angularly related struts 22. The struts 22 are fixed to the external surface of the mid-portion of the elongated base 20 and to the internal surface of the sleeve 18 so that the struts serve to support the base 20 in its concentric relationship with the sleeve 18.

As a practical matter, the struts 22 are disposed in orthogonally related planes and serve to unite the body 21 with the sleeve 18. Thus, the mid-portion of the bellows 14 is supported by the struts 22 radiating from the base 20.

Each of the supports 12 is pivotally connected with one end of the base 20 through an elongated connecting body, generally designated 24. Each of the connecting bodies 24 is of an elongated configuration and includes a pedestal 26 from which also radiates a plurality of orthogonally related struts 28. In practice, the struts 28, for each of the connecting bodies 24, are disposed in a coplanar relationship with the struts 22 and are united at their distal ends with the internal annular surface of one of the supports 12. The pedestal 26, for each of the struts 28, is further connected to the body 21 of the base 20 through a knuckle joint generally designated 30.

Each knuckle joint 30 functions as a universal joint and includes a socket 32 formed in one end of the body 21 and a ball 34 seated within the socket. A knuckle pin 36 is extended through coaxially aligned bores, not designated, formed in the body 21 and the ball 34 for securing the ball 34 within the socket 32.

The knuckle joint 30 further includes a truncated segment of a socket 38 formed in a relieved portion, not designated, of the pedestal 26, in spaced relation with the struts 28. The segment also receives the ball 34 in a manner such that the internal surface of the truncated segment of the socket 38 has a radius projected from the symmetric center of the knuckle pin 36. It is here important to note that the relieved portion of the pedestal 26 has a thickness substantially less than the diameter of the ball 34 so that omnidirectional oscillatory motion of the connecting body 24 relative to any axes diametrically related to the ball 34 is accommodated.

The connecting bodies 24 are interconnected through motion restraining arms, designated 40 and 42, which junction at a knee joint, generally designated 44. The motion restraining arms 40 and 42 are projected axially from the connecting bodies 24, along the longitudinal axis of symmetry of the base 20, when the bellows 14 is in a linear configuration. It is important to note that the knuckle joints are interposed between the motion restraining arms 40 and 42 and opposite ends of the duct joint 10. Therefore, the distal ends of the motion restraining arms 40 and 42 are caused to move in a direction opposite to that in which the ends of the duct joint 10 are moved as deflection is imparted thereto. As a consequence, the knee joint 44 serves to stabilize the instantaneous length of the bend radius for thus assuring that as angular displacement is imparted to one end of the duct joint 10, angular motion, similar in direction and magnitude, uniformly is imparted to the opposite end portion of the duct joint. As a practical matter, the internal surface of the tubular bore 46 circumscribes the knee joint 44 and serves as a stop surface for limiting angular motion imparted to the distal ends of the arms 40 and 42 as deflection of the duct joint 10 occurs. It should readily be apparent that the bend radius for the duct joint 10 always is uniform, for any given angle of deflection.

In practice, a sleeve segment 48 is fixed to each of the supports 12, as by welding or the like, and extends into telescoped engagement with the adjacent end of the sleeve 18. Thus, the sleeve segments 48 and the sleeve 18 cooperate and serve to prevent flow impingement on the surface of the convolutions of the bellows 14 and thus inhibit flow-induced vibration fatigue in the bellows.

OPERATION

It is believed that in view of the foregoing description, the operation of the device will readily be understood and it will be briefly reviewed at this point.

With the flexible duct joint 10 fabricated in the manner hereinbefore described, it is to be understood that the joint is adapted to be united with adjacent segments of pressurizable ducts, not shown, through supports 12. Of course, as deflection of the duct joint 10 occurs, as the angular relationship of the ducts is varied, in any direction, the knee joint 44 becomes effective for causing the opposite end portions of the duct joint 10 to deflect uniformly because of the uniform pivotal motion imparted to the arms 40 and 42. Hence, the instantaneous bend radius of the duct joint 12 is at any instant uniform, throughout the length thereof, due to the stabilizing effect of the knee joint 44.

In view of the foregoing, it is believed to be apparent that through the instant invention, the perplexing problem of providing for lateral stability near the center span of an internally pressurized bellows has been solved.

Although the invention has been herein shown and described in what is conceived to be the most practical and preferred embodiment, it is recognized that departures may be made therefrom within the scope of the invention, which is not to be limited to the illustrative details disclosed.

I claim:

1. In a lightweight, flexible duct joint of the type including a convoluted, tubular bellows having opposite end portions adapted to be connected with adjacent segments of a pressurizable duct, whereby the duct joint operatively is subjected to internal pressure and angular deflections, the improvement comprising:
   means for controlling angular deflection imparted to said tubular bellows including:
   A. an elongated, rigid base disposed internally of the bellows and having an end portion disposed adjacent to each of the opposite end portions of said bellows, B. means including a plurality of angularly related struts projected from said base for connecting the bellows with the base, and C. means for interconnecting the opposite end portions of said bellows with the adjacent end portions of said elongated base including a pair of annular supports, each being affixed to one end portion of said bellows in concentric relation therewith, a pair of connecting bodies, each being rigidly affixed to one of said annular supports and pivotally connected to one end portion of said elongated base, and motion control means affixed to said connecting bodies for limiting angular motion imparted to said annular supports relative to said base.

2. The improvement of claim 1 wherein each connecting body of said pair of connecting bodies includes a plurality of angularly related struts extended radially with respect to one of said annular supports and rigidly affixed thereto, and means defining a pair of universal joints for coupling said pair of connecting bodies to said elongated base.

3. The improvement of claim 2 wherein said motion control means includes a pair of lever arms, each being projected axially from one of said connecting bodies with the distal ends thereof being disposed in a contiguous relationship, a ball-and-socket coupling interconnecting the distal ends of said lever arms, and stop means including a surface of an annular configuration circumscribing the distal ends of said lever arms.

4. The improvement of claim 3 wherein the base is of a tubular configuration and said pair of lever arms are connectrically related thereto.

5. A lightweight, flexible duct joint comprising:

A. a tubular, convoluted bellows having a pair of opposite end portions;

B. an elongated base, disposed internally of said bellows and having an end portion disposed adjacent to each of the opposite end portions of the bellows;

C. means for connecting said base to said bellows including a first plurality of angularly related struts projected radially from the base;

D. a pair of annular supports, each being rigidly affixed to one end portion of said bellows in a concentric relationship therewith, a pair of elongated connecting bodies, each including a further plurality of angularly related struts extended radially therefrom and affixed to the internal surfaces of one of said annular supports;

E. means including a pair of universal joints for coupling said connecting bodies with said elongated base; and F. motion control means including a pair of lever arms, each being projected axially from one of said connecting bodies, and a ball-and-socket joint interconnecting the distal ends of the lever arms internally of said base.

6. The duct joint of claim 5 further including a sleeve concentrically related to said base and supported by said first plurality of struts for preventing flow impingement on said bellows.

7. The duct of claim 6 wherein said means for connecting said base to said bellows further includes an annulus affixed to said sleeve in circumscribing relation therewith and affixed to the internal surface of said bellows near the mid-portion thereof.

* * * * *